Figure 7:
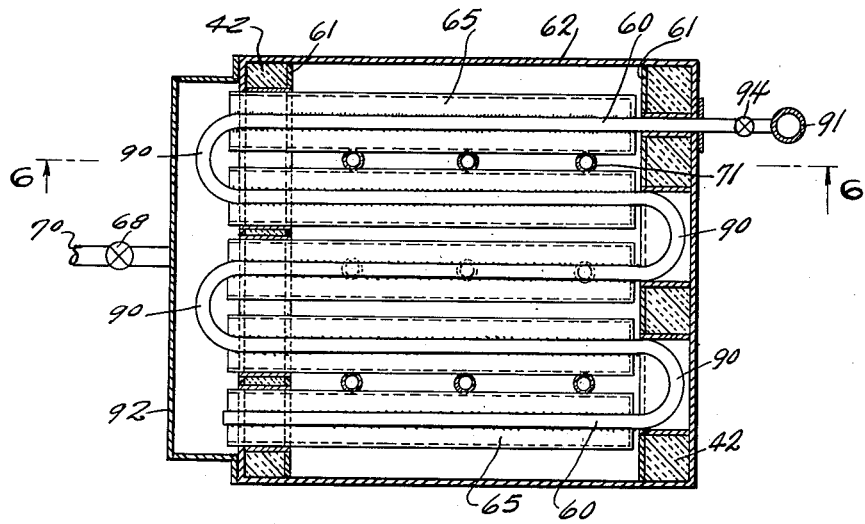

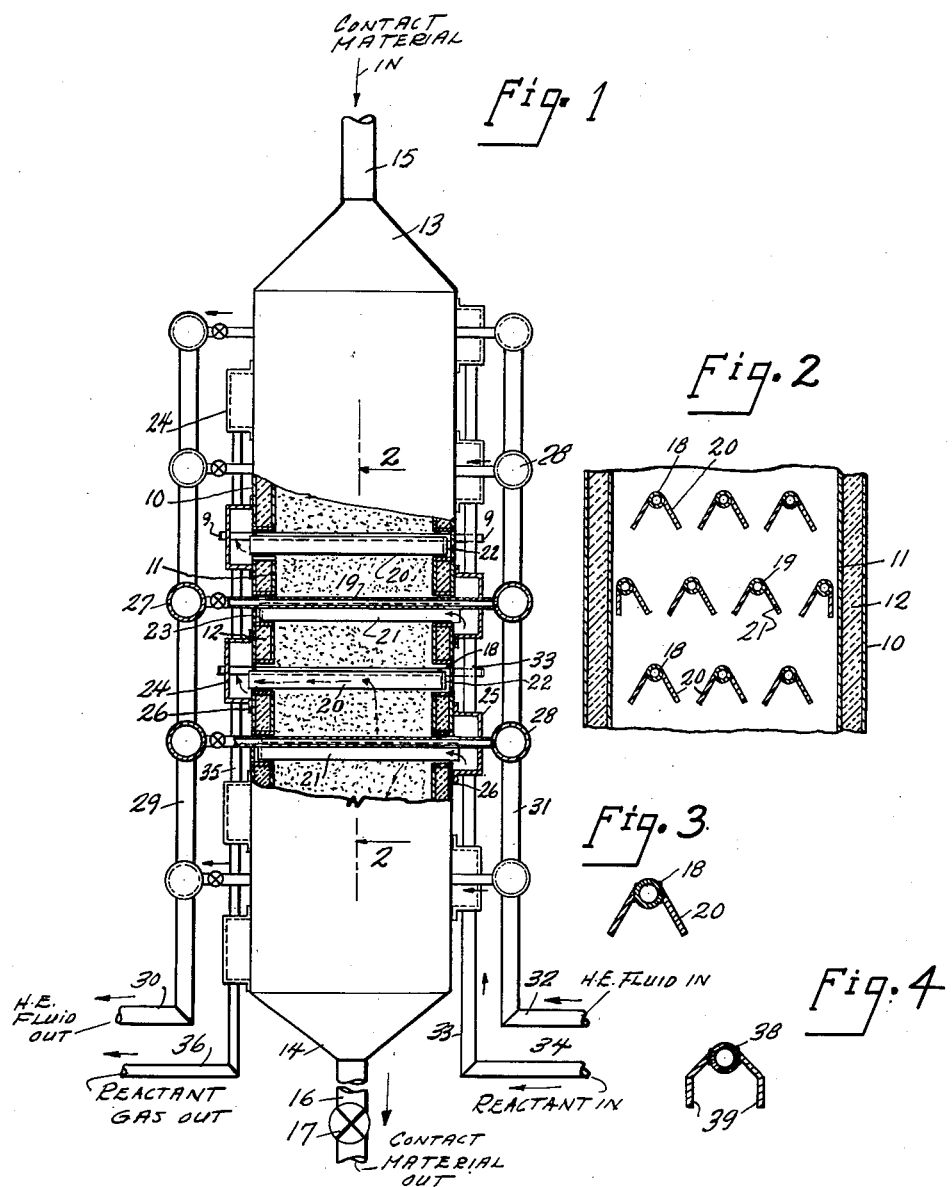

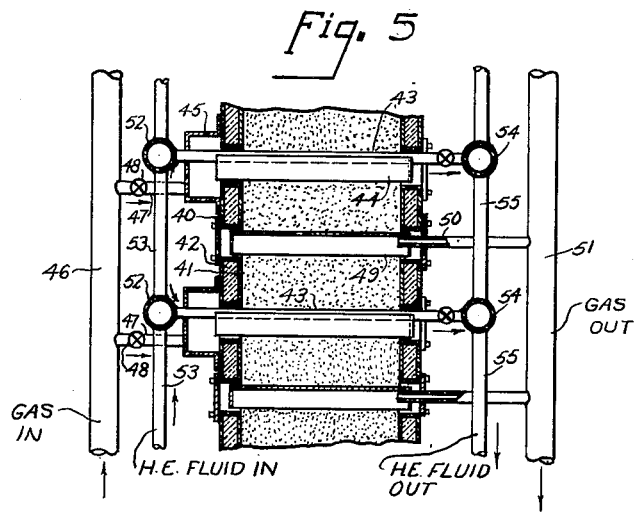
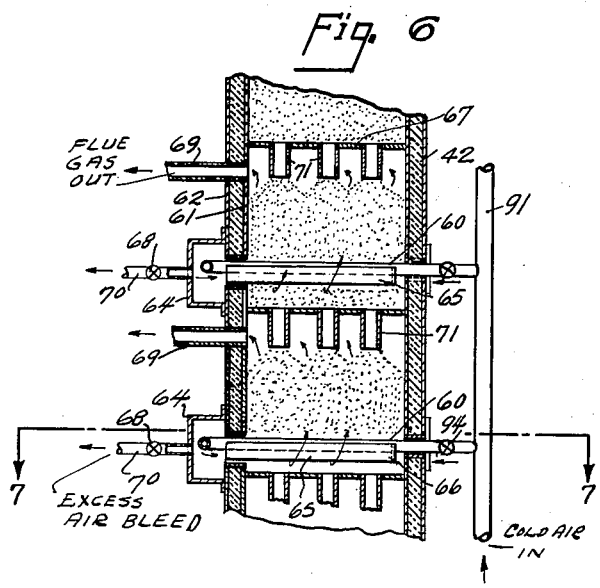

Patented Apr. 8, 1952

2,592,121

UNITED STATES PATENT OFFICE 2,592,121

REGENERATION OF A MOVING BED CATALYST AT A UNIFORM BURNING RATE

John A. Crowley, Jr., Scarsdale, N. Y., assignor to Socony-Vacuum Oil Company, Incorporated, a corporation of New York Continuation of application Serial No. 558,695, October 14, 1944. This application July 8, 1948, Serial No. 37,633

5 Claims. (Cl. 252—418)

This case is a continuation of application Serial Number 558,695, filed in the United States Patent Office October 14, 1944, now U. S. Patent No. 2,469,329.

This invention relates to processes wherein gaseous reactants are contacted with particle form solid materials at elevated temperatures for the purpose of thermochemical conversion. In such processes the solid material may or may not be catalytic in nature. Typical of such processes is the catalytic conversion of hydrocarbons and the subsequent regeneration of the catalytic material used therefor. It is well known that gas oils boiling in the range of 450° F. to 750° F. may be converted to gasoline and other products when contacted in the gaseous phase with particle form solid absorbent materials at controlled conditions of temperature such as, for example, 800° F. and higher and pressures usually above atmospheric. The particle form solid adsorbent material may partake of the nature of natural or treated clays such as fuller's earth, superfiltrol which is a treated natural clay comprising mainly alumina and silica, bauxite or of various synthetic associations of alumina, silica or alumina and silica, any of which may have other constituents added such as certain metallic oxides. In a most recent form, this operation has been developed as one wherein a particle form solid contact mass material is passed cyclically as substantially compact columns through two vessels, in the first of which it is contacted with hydrocarbons in the gaseous phase for the purpose of conversion thereof and in the second of which it is subjected to the action of a combustion supporting gas acting to burn therefrom a carbonaceous contaminant deposited thereon in the hydrocarbon conversion vessel. In such a process the conversion of hydrocarbon gases is a net endothermic reaction and the combustion of the contaminant deposit is a net exothermic reaction, the one requiring the supply of heat from an outside source and the other requiring the removal of heat. The present invention is particularly directed to a method for conducting exothermic reactions such as the burning regeneration of spent contact materials.

When clay-type catalysts are regenerated, the temperature thereof must be controlled below a maximum temperature, above which it will be heat damaged. This maximum allowable temperature may be of the order of 1100° F. to 1400° F., depending upon the catalyst involved.

In processes involving the passage of such catalysts through a regenerator as a substantially compact column of particle form material, the excess heat of combustion may be removed by the provision of heat transfer tubes throughout the regenerator. In such an apparatus proper temperature control is obtained only by the use of a great amount of heat transfer surface requiring the maintenance of the solid material temperature reasonably near that of the heat transfer medium. Due to the difficulty of obtaining suitable heat exchange fluids which are stable at temperatures of 1000° F.–1200° F., for example, a large part of the solid material is maintained at somewhat lower temperatures during the entire regeneration. This is a disadvantage because generally the composition of the contaminant deposit changes as the regeneration progresses, and requires increasingly higher temperatures for its rapid combustion as the regeneration approaches completion. Often the temperatures required for complete and rapid removal of the last part of the contaminant are below those which will damage the solid material but above those obtainable in the apparatus above described. Moreover, although the combustion of a given contaminant might take place very rapidly at a temperature of 900° F., for example, in those sections of the regenerator near the air inlet where the oxygen content of the gas was high, yet the reaction might be very slow at this temperature in other sections of the regenerator where the oxygen, having been partly used, is substantially lower in partial pressure. If, however, higher temperatures of the order say 1000° F. to 1100° F. could be provided in those latter sections of the regenerator high combustion rates would be obtainable there also.

In order to avoid the disadvantages of regenerators of the above type and also to provide higher total gas throughput capacity, regenerators and reactors have recently been provided which consist of a series of alternate reaction and heat exchange stages, the reactant gas being passed in parallel through the reaction stages. The present invention differs in several respects from such multistage vessels and offers several advantages thereover. An important embodiment of the present invention involves the passage of the spent contact material through a series of regeneration zones, into each of which an oxygen containing gas is introduced and in each of which the heat of regeneration is removed by cooling the solid material by indirect heat transfer only in the immediate vicinity of the locations of gas introduction so that the contaminant burning may be conducted in other portions of the regeneration zones in the absence of cooling by indirect heat transfer.

A major object of this invention is the provision in a process for regenerating spent contact materials bearing carbonaceous deposits by burning of an improved method for removing the heat of reaction from the regeneration zone and for effecting contact between the regeneration gas and the contact material under optimum temperature conditions.

Another object of the invention is the provision in a process for regeneration of a contaminant bearing particle form solid contact mass material by the action of a combustion supporting gas, of a method and apparatus wherein sufficient heat may be removed from the solid material in those sections of the regeneration zone wherein the regeneration gas is fresh to control the solid material temperature within predetermined limits throughout the entire regeneration zone without the requirement of proximate heat transfer surfaces in those sections of the regeneration zone wherein the combustion supporting gas is relatively spent.

These and other objects of this invention will become apparent from the following description of this invention. Before proceeding with said description certain terms used herein should be defined. The term "gas" or "gaseous material" as used herein and in the claming of this invention are intended to cover any material in the gaseous phase at the temperature of the operation or reaction regardless of its normal phase at atmospheric temperature. The word "tube" or "tubes" are intended as covering not only circular conduits but conduits of any other contour.

Referring now to the drawings, Figure 1 is an elevational view, partially in section, showing a reaction vessel constructed according to this invention. Figure 2 is a vertical sectional view taken along line 2—2 in Figure 1, Figure 3 is an enlarged sectional view of one of the combined heat transfer and gas handling elements used in the apparatus of Figure 1, Figure 4 is a sectional view of a modified form of such an element, Figures 5 and 6 are elevational views, partially in section of vertical sections of somewhat modified reaction or regeneration vessels according to this invention and Figure 7 is a cross-sectional plan view taken along the line 7—7 of Figure 6.

Turning now to Figure 1, we find 10 is the outer shell of a vertical reaction vessel which may be circular or rectangular in cross-sectional contour, 11 is the inner shell thereof and 12 is a layer of insulating material between the two shells. The shell 10 is closed on its upper end by the converging section 13 and on its lower end by converging section 14. An inlet conduit 15 for solid material is connected into the upper section 13 and an outlet conduit 16 having throttle valve 17 thereon is depended from the lower section 14. A plurality of vertically spaced rows of horizontally spaced tubes 19 extend across the vessel and through opposite walls thereof. Similar rows of tubes 18 extend across the vessel at levels intermediate the tubes 19, and the tubes 18 and 19 connect at their ends into headers 27 and 28. Two similar fins are attached as by welding along the length of each tube on either side thereof and extend downwardly and outwardly therefrom, so as to provide a solid material-excluding gas space extending along underneath each tube. The fins 20 on tubes 18, which join alternate rows, terminate within the vessel short of the outer shell on one end and plates 22 are provided across the ends of each set of fins on each tube. These fins extend through the vessel shell on the opposite end into the gas outlet manifold box 24 which is attached along the shell, thus communicating each alternate row of gas spaces joined by tubes 18 and fins 20 with a gas outlet manifold box. The fin arrangement on the remaining alternate rows 19 of tubes is similar to that above described except that the fins terminate within the vessel and are provided with end plates 23 on the opposite end and extend through the opposite wall of the vessel into gas outlet manifold boxes 25 which extend horizontally across the shell and are attached thereto by flanges 26.

The arrangement may be more clearly understood by reference to Figure 2 which is a sectional view along line 2—2 of Figure 1 and in which like members bear like numerals. It will be seen from Figure 2 that the tubes 19 are offset horizontally so as to lie in the vertical plane between adjacent tubes 18 in the rows above and below. In the vessel shown, the cross-section was such as to require four tubes in some rows and only three in others, in order to provide uniform tube and fin distribution across the vessel cross-section. The invention is not to be limited, however, to such proportion. It will also be noted that the outside fins, on the end tubes in the rows containing four tubes, extend substantially vertically downward.

Turning again to Figure 1, the rows of tubes 19 terminate on one end in horizontal outlet headers 27, which are provided for each row, and on their opposite ends in horizontal inlet headers 28, also provided for each row. The outlet headers are interconnected by riser pipes 29 to the lowermost of which is connected the main outlet conduit 30; and the inlet headers are interconnected by riser pipes 31 to the lowermost of which is connected the main inlet conduit 32. Similarly, the gas inlet manifold boxes 25 are interconnected by riser pipes 33 to the lowermost of which is connected the main gas inlet conduit 34, and the outlet manifold boxes 24 are interconnected by riser pipes 35 to the lowermost of which the main gas outlet pipe 36 is connected.

In operation particle form solid material at the desired reaction temperature enters the vessel through conduit 15 and passes downwardly therethrough as a substantially compact column. The solid material is prevented from channeling downwardly in any given vertical path by the staggered arrangement of the alternate rows of tubes and fins. Contacted solid material is withdrawn from the lower end of the vessel through conduit 16, the rate of withdrawal being controlled by throttle valve 17. Gasiform reactants at the desired reaction temperature enter through conduit 34 and riser pipes 33 into the several inlet manifold boxes 25. The gas is then distributed into the several vertically spaced rows of gas spaces provided by tubes 19 and fins 20. From these gas distributing spaces the reactant gas passes upwardly and downwardly through the solid material toward the nearest rows of gas collecting spaces formed by tubes 18 and fins 20. The gas then disengages from the solid material and collects in these latter gas spaces and passes therefrom into outlet manifold boxes 24 and then through pipes 35 to the main gas outlet conduit 36. There are thus provided a series of superimposed reaction zones wherein the vertical direction of gas flow is opposite in successive zones. The solid material temperature is controlled by supply of a heat exchange fluid through conduit 32, riser pipes 31 and manifolds 28 to the heat transfer tubes 19. The heat exchange fluid passes from the opposite ends of the tubes into manifolds 27, and thence through pipes 29 to the main outlet conduit 30. Thus the solid material temperature is adjusted at a plurality of levels along the vessel, by indirect heat transfer with a heat exchange fluid, the temperature adjustment being sufficient at each level to prevent the solid material temperature from rising beyond a predetermined limit during its passage between heat exchange levels. When exothermic reactions such as catalyst regeneration are conducted in such an apparatus the reaction temperature may be accurately controlled within the desired range throughout the reaction zone.

The combined heat transfer and gas handling element permits a substantial reduction in the total metal required within the conversion vessel. This is apparent when it is considered that on the one hand the fins which define the gas distributing and collecting spaces also serve as additional heat transfer surfaces thereby reducing the total number of heat transfer tubes required, while on the other hand, the heat transfer tubes serve both to help define the gas distributing and collecting spaces and also to support the fins. Figure 3 is an enlarged sectional view showing the construction of the combined heat transfer element and gas handling elements used in the apparatus of Figure 1; like numerals are used for like members. In some operations larger gas spaces are desirable in which case the fin shape and size may be varied. Such a modified form is shown in Figure 4. In Figure 4, the element is comprised of a circular tube 38 and two angle shaped fins 39, one welded along either side of the tube. When tubes of relatively large diameter are employed, fins attached along their sides and extending substantially vertically downward may be used. Moreover, if desired, tubes of cross-sectional shapes other than circular may be used. In some modifications, it may be desirable to interconnect the ends of adjacent tubes in each row so as to provide a continuous coil for heat exchange fluid flow in each row of tubes. Such a modification is particularly desirable when a relatively great change in the temperature of the heat exchange fluid is desired.

Turning to Figure 5, there is shown a modified form of the invention in which the vessel is of generally the same type as that shown in Figure 1 except for internal modifications as described hereinafter. In Figure 5, 40 represents the outer shell of the vessel, 41 the inner shell and 42 the insulator therebetween. Heat transfer tubes 43 having fins 44 attached along their length are provided in a plurality of vertically spaced rows across the vessel. These elements serve as combined gas inlet distributing and heat transfer elements similarly to those shown in Figures 1 and 2, gas inlet manifold boxes 45 being provided along one side of the vessel shell. A main gas inlet riser pipe 46 is provided from which gas is distributed through pipes 47 having valves 48 thereon into the several inlet manifold boxes. Intermediate the rows of combined heat transfer and gas distributing elements, rows of inverted angle shaped troughs 49 are positioned across the vessel. These channel members are closed on either end and terminate within the vessel short of the external shell. These channels serve as gas collectors and gas is removed therefrom through pipes 50 which extend through the vessel shell and a short distance under the collectors on one end and each of which pipes 50 is connected into the gas outlet duct 51 on the opposite end. The heat transfer tubes connect on their inlet ends into inlet manifolds 52 which are interconnected through pipes 53; and the heat transfer tubes are connected on their outlet ends into manifolds 54 which are interconnected through outlet riser pipes 55. The construction is thus such as to divide the regenerator into a series of superimposed stages wherein the gas flow is alternately vertically upward and downward through the solid material column flowing therethrough. The solid material temperature is adjusted only in that section of the vessel in the immediate vicinity of the gas inlets in which section the regeneration gas, for example, air, is fresh. Thus the solid material in passing by a given row of heat transfer tubes may be cooled from a temperature of about 1150° F. to a temperature of about 900° F. and may then be heated in the section of the regenerator between rows of tubes back to about 1100° F. by the heat liberated by contaminant combustion. The temperature of the solid material passing by the gas collectors where the oxygen partial pressure is relatively low may be of the order of 1025° F.–1050° F. Thus, by permitting the combustion reaction to proceed at a somewhat higher temperature and in the absence of proximate heat transfer surfaces in those sections of the regenerator wherein the air is relatively spent than in those sections wherein the air is fresh, a high and uniform rate of contaminant combustion is provided throughout the renegator resulting in higher overall burning capacity and efficiency.

Another modification of the invention is shown in Figures 6 and 7 which may be best studied together. Figure 7 is a cross-sectional plan view taken along line 7—7 of Figure 6. The regenerator shown in Figures 6 and 7 is divided into a series of communicating stages by means of vertically spaced horizontal partitions 67 and depending catalyst flow pipes 71. Flue gas is withdrawn from the disengaging space provided by the pipes 71 in each stage by means of conduits 69. Near the lower end of each stage there is provided a row of horizontal tubes 60 which extend through the inner shell 61 and outer shell 62 of the vessel on opposite ends. The tubes are connected together on their ends by U-bends 90 so as to provide a continuous coil, one end of which connects into the vertical external gas inlet manifold 91 and the other end of which opens into the manifold box 64 which extends horizontally across the outside of the vessel shell 62. The manifold box communicates with the space formed by fins 65 underneath the tubes 60.

In operation cool air or other oxygen containing gas is supplied via manifold 91 to the coils formed by tubes 60 and U-bends 90 in each stage at a suitable rate controlled by valve 94. The total number of coils and the rate and temperature of gas flow is sufficient to remove from the contact material the heat liberated by contaminant burning by means of indirect heat transfer through the tubes 60. Thereby, the contact material is maintained below a heat damaging level throughout all of the burning zones even though the indirect heat transfer occurs only in a portion of each zone. The cold air which is thereby preheated issues from the end tube 60 in each stage into manifold box 64 and is then distributed into the spaces under the tubes 60 in that stage. The gas then flows upwardly through the catalyst in each stage to effect contaminant burning and is withdrawn separately from each stage via conduits 69. The pipes 71 are of such restricted cross-sectional area relative to the entire vessel cross-section as to provide, when filled with flowing catalyst, a seal against substantial gas flow between stages. Usually, more air is required to effect heat removal from the catalyst undergoing regeneration than is required to effect the contaminant combustion. The excess air is withdrawn via pipes 70 from manifold boxes 64 at the proper rate controlled by valves 68. This air may be passed to a suitable external exchanger (not shown) to recover the heat therefrom and then it may be either discarded or recycled as charge air to the regenerator. It will be apparent that this modified operation also provides cooling only in the immediate vicinity of gas introduction into each burning stage so as to permit burning in the absence of cooling and at a substantially higher temperature in the portion of each stage wherein the oxygen partial pressure is lowest. Also, this operation permits the utilization of the regeneration heat for preheating the air employed for the regeneration thereby providing a very economical and practical method of operation. Since the several regeneration zones are substantially independent so far as gas flow and the rate of cooling is concerned, the temperature and other operation conditions may be varied independently from stage to stage in the direction dictated by the changing composition of the coke deposit as its removal from the contact material progresses.

It will be understood that this invention is not intended to be limited only to the specific examples of operating conditions or of process application given hereinabove.

I claim:

1. A method for regenerating a particle form solid contact mass material bearing a carbonaceous contaminant deposit comprising: passing said solid material downwardly through a confined zone as a substantially compact column while causing it, as it flows downwardly, to follow a temperature pattern wherein it gradually rises to a peak and then gradually declines to a minimum followed by a repetition of this cycle a plurality of times, the peak temperatures being attained at a plurality of spaced levels due to heat released by contaminant combustion and the minimum temperatures being attained at a second and alternate plurality of levels by passing a cooling fluid in indirect heat transfer relationship with said column at spaced apart levels and said peak temperatures being all below a level which would cause heat damage to the contact material, while said minimum temperatures are all sufficiently high for contaminant combustion, introducing oxygen containing gas into said column only at levels near and immediately below said second plurality of levels, whereby the fresh gas initially contacts solid material which is near a minimum temperature, and withdrawing spent regeneration gas from said column at a plurality of levels intermediate the levels of gas introduction and spaced vertically away therefrom, the column being free of cooling by indirect heat transfer at said levels of gas withdrawal.

2. The method of burning a contaminant deposit from a particle form solid adsorbent material while controlling the temperature thereof between predetermined limits comprising: maintaining a substantially compact vertical column of particle form solid adsorbent material, withdrawing regenerated solid material from the lower end thereof and replenishing said column at its upper end with contaminant bearing solid material, introducing a regeneration gas through a plurality of inlet distributors distributed in a plurality of horizontal planes throughout said column of solid material, withdrawing used regeneration gas therefrom through a plurality of outlets similarly distributed in horizontal planes alternating with those wherein said inlet distributors are located, and at the same time passing a cooling fluid in indirect heat transfer relationship with said column at levels located immediately above the places of initial gas contact with the column of moving solid material through a plurality of horizontal heat transfer conduits, each heat transfer conduit serving also as a component part of one of said inlet distributors, so as to control the solid material temperature range between predetermined limits throughout said column while permitting the regeneration reaction to proceed in a substantial portion of said column between the heat transfer conduits and said regeneration gas outlets in the absence of a proximate heat transfer surface.

3. A method for regenerating spent particle form contact material bearing carbonaceous deposits by burning which comprises: passing the contact material through a series of communicating regeneration zones, introducing an oxygen containing gas into each of said zones and passing its through said zones in contact with the contact material to effect the combustion of the carbonaceous deposit thereon, whereby the temperature of the contact material is increased as it flows through each zone, withdrawing used regeneration gas from each zone at a point remote from the point of its introduction thereto, adjusting the temperature of the contact material by passing a cooling fluid in indirect heat transfer with the flowing contact material and oxygen containing gas in each zone only at a location immediately above the point of oxygen containing gas introduction to said zone whereby the contact material temperature is lowered immediately prior to its reaching the point of oxygen containing gas introduction, while excluding cooling by indirect heat transfer in that portion of the zones near the points of gas withdrawal and controlling the amount of heat removal by indirect heat transfer to maintain the contact material below a heat damaging level during its flow through said regeneration zones.

4. A method for regenerating spent particle form contact material bearing carbonaceous deposits by burning which comprises: passing the contact material downwardly through a confined regeneration zone as a substantially compact column of gravitating particles, passing a cool oxygen containing gas in indirect heat transfer relationship with said column at a plurality of levels vertically spaced apart along the length of the column to remove the burning heat from said column and to preheat said gas, introducing the preheated gas into said column only immediately below said levels of indirect heat transfer, withdrawing used regeneration gas from said column at a plurality of levels located along said column intermediate the levels of gas introduction, whereby the gas flows through said column away from the levels of indirect heat transfer and towards the intermediate levels of its withdrawal while effecting contaminant combustion initially where the oxygen partial pressure is highest in the presence of indirect heat transfer and later at higher temperatures in the absence of indirect heat transfer in the portions of said column adjacent the levels of gas withdrawal where the oxygen partial pressure is lowest.

5. A method for regenerating spent particle form contact material bearing carbonaceous deposits by burning which comprises: passing the contact material downwardly through a confined regeneration zone as a substantially compact column of gravitating particles, passing a cool oxygen containing gas in indirect heat transfer relationship with said column at a plurality of levels vertically spaced apart along the length of the column to remove the burning heat from said column and to preheat said gas, discarding a portion of said preheated gas and introducing the remaining portion thereof into said column immediately below each of the levels of said indirect heat transfer, withdrawing used regeneration gas in which the oxygen partial pressure is relatively low from said column at a plurality of levels intermediate and remote from said levels of introduction, whereby the gas introduced at each level initially contacts the contact material in the presence of cooling by indirect heat transfer and then flows through said column away from said levels of indirect heat transfer towards the intermediate levels of its withdrawal while the oxygen in said gas is being used for contaminant combustion initially in the presence of cooling by indirect heat transfer and later at higher temperatures in the absence of indirect heat transfer as the gas approaches the levels of withdrawal and as the partial pressure of the oxygen in said gas decreases.

JOHN A. CROWLEY, Jr.

REFERENCES CITED

The following references are of record in the file of this patent:

UNITED STATES PATENTS

| Number | Name | Date |
| --- | --- | --- |
| 1,784,536 | Pantenburg | Dec. 9, 1930 |
| 1,905,883 | Barstow et al. | Apr. 25, 1933 |
| 1,953,938 | Jaeger | Apr. 10, 1934 |
| 2,173,844 | Houdry | Sept. 26, 1939 |
| 2,331,433 | Simpson et al. | Oct. 12, 1943 |
| 2,364,453 | Layng et al. | Dec. 5, 1944 |
| 2,372,018 | Ruthruff | Mar. 20, 1945 |
| 2,409,596 | Simpson et al. | Oct. 15, 1946 |
| 2,436,780 | Simpson | Feb. 24, 1948 |
| 2,458,358 | Evans | Jan. 4, 1949 |
| 2,458,433 | Simpson | Jan. 4, 1949 |
| 2,458,434 | Simpson | Jan. 4, 1949 |

FOREIGN PATENTS

| Number | Country | Date |
| --- | --- | --- |
| 106,519 | Great Britain | Nov. 18, 1916 |